(12) United States Patent
Yu et al.

(10) Patent No.: US 9,647,816 B2
(45) Date of Patent: May 9, 2017

(54) WIRELESS LOCAL AREA NETWORK COMMUNICATIONS WITH VARYING SUBCARRIER SPACINGS

(71) Applicant: NEWRACOM, INC., Irvine, CA (US)

(72) Inventors: Heejung Yu, Daegu (KR); Minho Cheong, Irvine, CA (US); Hyoungjin Kwon, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 77 days.

(21) Appl. No.: 14/801,311

(22) Filed: Jul. 16, 2015

(65) Prior Publication Data

US 2016/0021568 A1 Jan. 21, 2016

Related U.S. Application Data

(60) Provisional application No. 62/025,340, filed on Jul. 16, 2014.

(30) Foreign Application Priority Data

Jul. 15, 2015 (KR) .................. 10-2015-0100376

(51) Int. Cl.
 *H04L 27/26* (2006.01)
 *H04L 5/00* (2006.01)
 *H04B 7/08* (2006.01)

(52) U.S. Cl.
 CPC .......... *H04L 5/0053* (2013.01); *H04B 7/0811* (2013.01); *H04L 5/0048* (2013.01); *H04L 27/2602* (2013.01); *H04L 27/2692* (2013.01); *H04L 27/2636* (2013.01)

(58) Field of Classification Search
 CPC .............. H04B 7/0811; H04L 27/2692; H04L 2027/0095; H04L 27/2636
 See application file for complete search history.

(56) References Cited

U.S. PATENT DOCUMENTS

| 2014/0192745 A1* | 7/2014 | Gao ................... H04L 5/001 370/329 |
| 2014/0307649 A1* | 10/2014 | Vermani ........... H04L 5/0044 370/329 |

OTHER PUBLICATIONS

Jinyoung Chun et al., "Legacy Support on HEW frame architecture", IEEE 11-13/1057r0, Sep. 16, 2013.*
Monnerie, Buffington, Shimada, Waheed, "IEEE 802.15.4g OFDM PHY Overview", IEEE 802.11-10/1305r1, Nov. 8, 2010.*

* cited by examiner

*Primary Examiner* — Andrew Chriss
*Assistant Examiner* — Salvador E Rivas

(57) ABSTRACT

An operation method of station in wireless local area network is provided. The operation method includes generating a legacy preamble, generating a high efficiency (HE) preamble including at least one HE-signal (HE-SIG) field, a HE-short training field (HE-STF), and at least one HE-long training field (HE-LTF), and generating a HE physical layer convergence procedure protocol data unit (HE-PPDU) including the legacy preamble and the HE preamble. Therefore, performance of WLAN can be enhanced.

19 Claims, 6 Drawing Sheets

WIRELESS LOCAL AREA NETWORK COMMUNICATIONS WITH VARYING SUBCARRIER SPACINGS

CROSS-REFERENCE TO RELATED APPLICATIONS

This application claims priority to U.S. Patent Application No. 62/025,340, filed on Jul. 16, 2014, and Korean Patent Application No. 10-2015-0100376, filed on Jul. 15, 2015, the entire contents of which are hereby incorporated by reference.

BACKGROUND

1. Technical Field

The present disclosure relates to a wireless local area network (WLAN) technology, and more particularly to methods for transmitting and receiving a physical layer convergence procedure protocol data unit (PPDU).

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies are created and standardized by the IEEE 802.11 Working Group under IEEE 802 Standard Committee. As such WLAN technology becomes more prevalent and its applications become more diverse, there is increasing demand for new WLAN technology that can support a higher throughput than existing WLAN technologies. Very high throughput (VHT) WLAN technology is proposed to support a data rate of 1 Gbps and higher. A WLAN technology according to IEEE 802.11ac standard is a technology providing VHT in sub 6 GHz band, and A WLAN technology according to IEEE 802.11ad standard is a technology providing VHT in 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11 ah standard is a technology which has been developed for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11ax standard is being developed for enhancing frequency efficiency of dense environments in which numerous access points and stations exist.

In the system based on such the WLAN technologies, a high throughput (HT) physical layer convergence procedure protocol data unit (PPDU) defined in IEEE802.11n standard may include a legacy preamble and a HT preamble, and the HT PPDU may further include a payload. A very high throughput (VHT) PPDU defined in IEEE802.11ac standard may include a legacy preamble and a VHT preamble, and the VHT PPDU may further include a payload.

SUMMARY

Accordingly, exemplary embodiments of the present disclosure are provided to substantially obviate one or more problems due to limitations and disadvantages of the related art. Exemplary embodiments of the present disclosure provide a method for transmitting and receiving a HE PPDU in a WLAN.

In order to achieve the objectives of the present disclosure, a transmission method performed in a station, the transmission method may include generating a legacy preamble; generating a high efficiency (HE) preamble including at least one HE-signal (HE-SIG) field, a HE-short training field (HE-STF), and at least one HE-long training field (HE-LTF); generating a HE physical layer convergence procedure protocol data unit (HE PPDU) including the legacy preamble and the HE preamble; and transmitting the legacy preamble, the at least one HE-SIG field, and the HE-STF through subcarriers having subcarrier spacing of 312.5 kHz, and transmitting the at least one HE-LTF through subcarriers having subcarrier spacing of 156.25 kHz or 78.125 kHz.

Here, the at least one HE-SIG field may include a HE-signal1 (HE-SIG1) field, a HE-signal2 (HE-SIG2) field, and a HE-signal3 (HE-SIG3) field.

Here, the HE-SIG1 field and the HE-SIG2 field may be modulated in binary phase shift keying (BPSK) manner, and the HE-SIG3 field may be modulated in quadrature BPSK (QBPSK) manner.

Here, the HE-SIG field may include a discrete Fourier transform (DFT) period having a length of 3.2 μsec.

Here, the HE-SIG field may be duplicated in unit of 20 MHz bandwidth.

Here, a number of the at least one HE-LTF included in the HE preamble may be configured based on a number of spatial streams onto which the HE PPDU is mapped.

Here, the HE-STF may include a DFT period having a length of 3.2 μsec.

Here, the HE-LTF may include a guard interval (GI) having a length of 0.8 μsec, 1.6 μsec, or 3.2 μsec.

Here, the HE-LTF may be transmitted through subcarriers having subcarrier spacing of 156.25 kHz when the HE-LTF includes a DFT period having a length of 6.4 μsec.

Here, the HE-LTF may be transmitted through subcarriers having subcarrier spacing of 78.125 kHz when the HE-LTF includes a DFT period having a length of 12.8 μsec.

Here, the HE-SIG filed may be a HE-SIG-A field or a HE-SIG-B field.

In order to achieve the objectives of the present disclosure, a reception method performed in a station, the reception method may include receiving a legacy preamble, and at least one high efficiency signal (HE-SIG) field and a HE-short training field (HE-STF) included in a HE preamble through subcarriers having subcarrier spacing of 312.5 kHz; and receiving at least one HE-long training field (HE-LTF) included in the HE preamble through subcarriers having subcarrier spacing of 156.25 kHz or 78.125 kHz.

Here, the at least one HE-SIG field may include a HE-signal1 (HE-SIG1) field, a HE-signal2 (HE-SIG2) field, and a HE-signal3 (HE-SIG3) field.

Here, the HE-SIG1 field and the HE-SIG2 field may be modulated in binary phase shift keying (BPSK) manner, and the HE-SIG3 field may be modulated in quadrature BPSK (QBPSK) manner.

Here, the HE-SIG field may include a discrete Fourier transform (DFT) period having a length of 3.2 μsec.

Here, the HE-SIG field may be duplicated in unit of 20 MHz bandwidth.

Here, the HE-STF may include a DFT period having a length of 3.2 μsec.

Here, the HE-LTF may include a guard interval (GI) having a length of 0.8 μsec, 1.6 μsec, or 3.2 μsec.

Here, the HE-LTF may be received through subcarriers having subcarrier spacing of 156.25 kHz when the HE-LTF includes a DFT period having a length of 6.4 μsec.

Here, the HE-LTF may be received through subcarriers having subcarrier spacing of 78.125 kHz when the HE-LTF includes a DFT period having a length of 12.8 μsec.

Here, the HE-SIG filed may be a HE-SIG-A field or a HE-SIG-B field.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
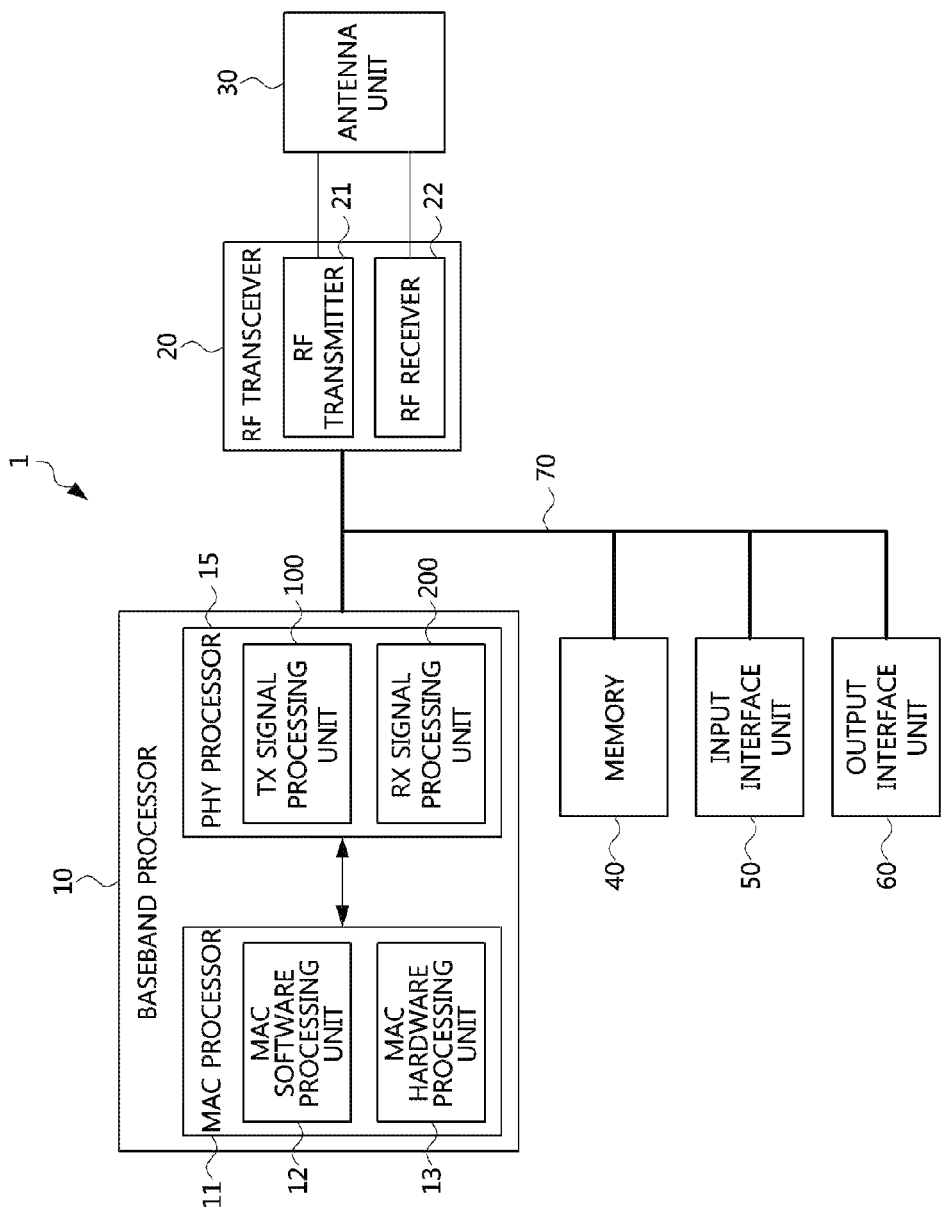
FIG. 1 is a block diagram illustrating a structure of a WLAN device according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all of the plurality of WLAN devices may be non-AP STAs in Ad-hoc networking. In general, the AP STA and the non-AP STAs may be collectively called the STA. However, for ease of description herein, only the non-AP STAs are referred to as the STAs.

FIG. 1 is a block diagram illustrating a structure of a WLAN device according to an embodiment.

Referring to FIG. 1, the WLAN device 1 may include a baseband processor 10, a radio frequency (RF) transceiver 20, an antenna unit 30, a memory 40, an input interface unit 50, an output interface unit 60, and a bus 70. The baseband processor 10 may perform baseband signal processing, and may include a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, embodiments of the MAC processor 11 are not limited to this. The PHY processor 15 may include a transmitting (Tx) signal processing unit 100 and a receiving (Rx) signal processing unit 200.

The baseband processor 10, the memory 40, the input interface unit 50, and the output interface unit 60 may communicate with each other via the bus 70. The RF transceiver 20 may include an RF transmitter 21 and an RF receiver 22. The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
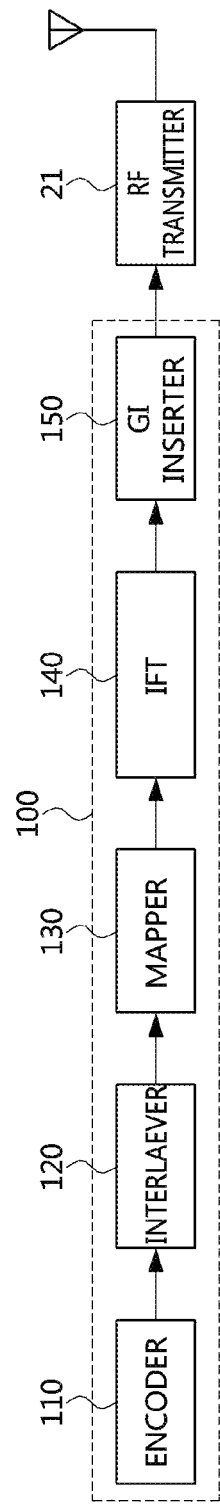
FIG. 2 is a schematic block diagram illustrating a transmitting signal processing unit 100 according to an embodiment suitable for use in a WLAN.

FIG. 2 is a schematic block diagram illustrating a transmitting signal processing unit 100 according to an embodiment suitable for use in a WLAN.

Referring to FIG. 2, a transmitting signal processing unit 100 may include an encoder 110, an interleaver 120, a mapper 130, an inverse Fourier transformer (IFT) 140, and a guard interval (GI) inserter 150.

The encoder 110 encodes input data. For example, the encoder 110 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change an order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers 130 corresponding to a number of spatial streams Nss. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper. When the MU-MIMO is used, some blocks before the spatial mapper may be provided for each user.

The GI inserter 150 prepends a guard interval (GI) to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
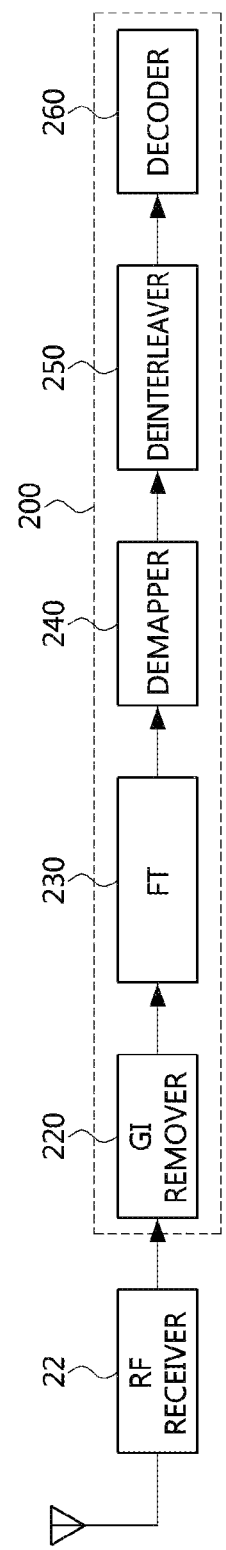
FIG. 3 is a schematic block diagram of a receiving signal processing unit according to an embodiment suitable for use in the WLAN.

FIG. 3 is a schematic block diagram of a receiving signal processing unit according to an embodiment suitable for use in the WLAN.

Referring to FIG. 3, a receiving signal processing unit 200 may include a GI remover 220, a Fourier transformer (FT) 230, a demapper 240, a deinterleaver 250, and a decoder 260. An RF receiver 22 receives an RF signal via the antenna unit 30 and converts the RF signal into a symbol. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain. When the MIMO or the MU-MIMO is used, the receiving signal processing unit 200 may include a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MEMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal-processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder 260, the receiving signal processing unit 100 may not use the encoder deparser.

Figure 4:
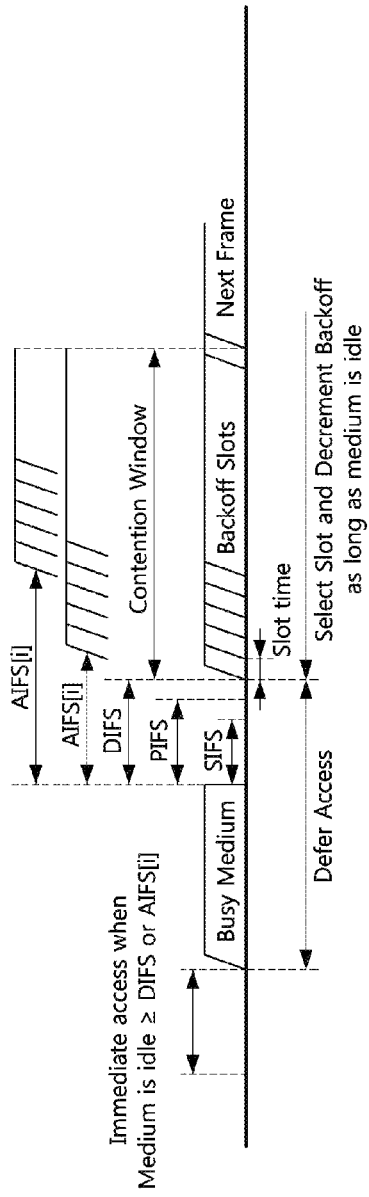
FIG. 4 illustrates interframe space (IFS) relationships.

FIG. 4 illustrates interframe space (IFS) relationships.

Referring to FIG. 4, a data frame, a control frame, or a management frame may be exchanged between WLAN devices. The data frame is used for transmission of data forwarded to a higher layer. The WLAN device transmits the data frame after performing backoff if a distributed coordination function IFS (DIFS) has elapsed from a time when the medium has been idle.

The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. When the control frame is not a response frame of a previous frame, the WLAN device transmits the control frame after performing backoff when the DIFS has elapsed. When the control frame is the response frame of the previous frame, the WLAN device transmits the control frame without performing backoff when a short IFS (SIFS) has elapsed. The type and subtype of frame may be identified by a type field and a subtype field in a frame control field.

On the other hand, a Quality of Service (QoS) STA may transmit the frame after performing backoff when an arbitration IFS (AIFS) for access category (AC), i.e., AIFS[AC] has elapsed. In this case, the data frame, the management frame, or the control frame which is not the response frame may use the AIFS[AC].

Figure 5:
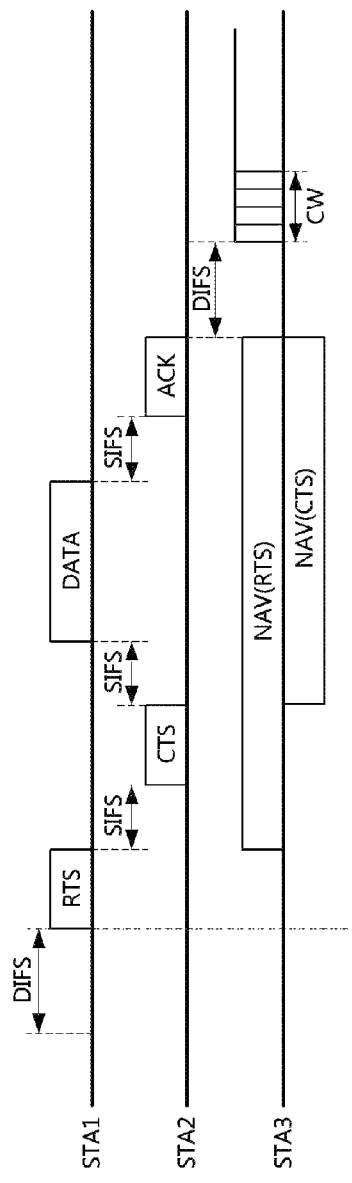
FIG. 5 is a timing diagram illustrating a frame transmission procedure based on a CSMA (carrier sense multiple access)/CA (collision avoidance) manner for avoiding collision between frames in a channel.

FIG. 5 is a timing drawing illustrating a frame transmission procedure based on a CSMA (carrier sense multiple access)/CA (collision avoidance) manner for avoiding collision between frames in a channel.

Referring to FIG. 5, STA1 is a transmit WLAN device for transmitting data, STA2 is a receive WLAN device for receiving the data, and STA3 is a third WLAN device which may be located at an area where a frame transmitted from the STA1 and/or a frame transmitted from the STA2 can be received by the third WLAN device STA3.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When it is determined that the channel is not in use by other devices during DIFS (that is, the channel is idle), the STA1 may transmit an RTS frame to the STA2 after performing backoff. Upon receiving the RTS frame, the STA2 may transmit a CTS frame as a response of the CTS frame after a SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the CTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after a SIFS elapses from a time when the CTS frame has been completely received. Upon successfully receiving the data frame, the STA2 may transmit an ACK frame as a response of the data frame after a SIFS elapses.

When the NAV timer expires, the STA3 may determine whether the channel is busy by the carrier sensing. Upon determining that the channel is not in use by the other devices during DIFS after the NAV timer has expired, the STA3 may attempt the channel access after a contention window according to random backoff operation.

Meanwhile, the station may transmit a physical layer convergence procedure protocol data unit (PPDU) in unit of bandwidth equal to or smaller than 20 MHz bandwidth. In case of subcarrier spacing of 312.5 kHz, 156.25 kHz, or 78.125 kHz, a frequency band having 20 MHz bandwidth may respectively include 64, 128, or 256 subcarriers. In the following description, a high efficiency (HE) PPDU transmitted through the frequency band including subcarriers having subcarrier spacing of 312.5 kHz, 156.25 kHz, or 78.125 kHz will be explained.

Figure 6:
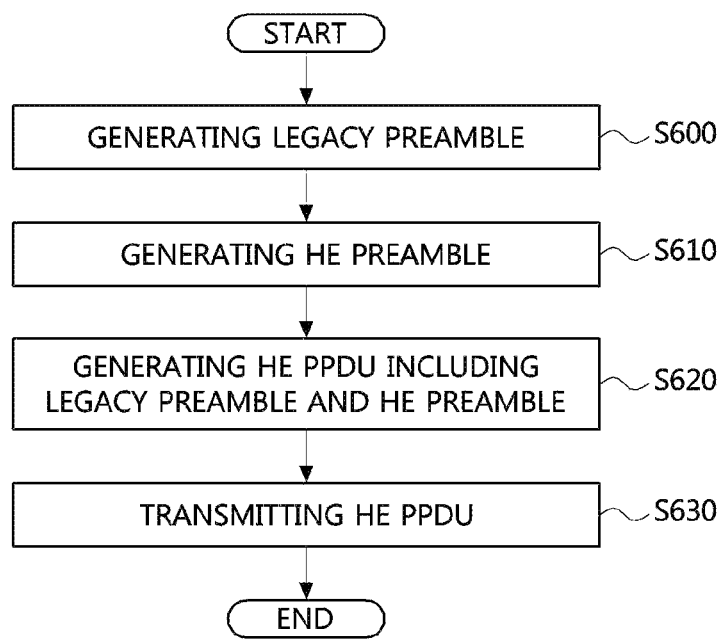
FIG. 6 is a flow chart illustrating a method for transmitting a HE PPDU.
Figure 7:
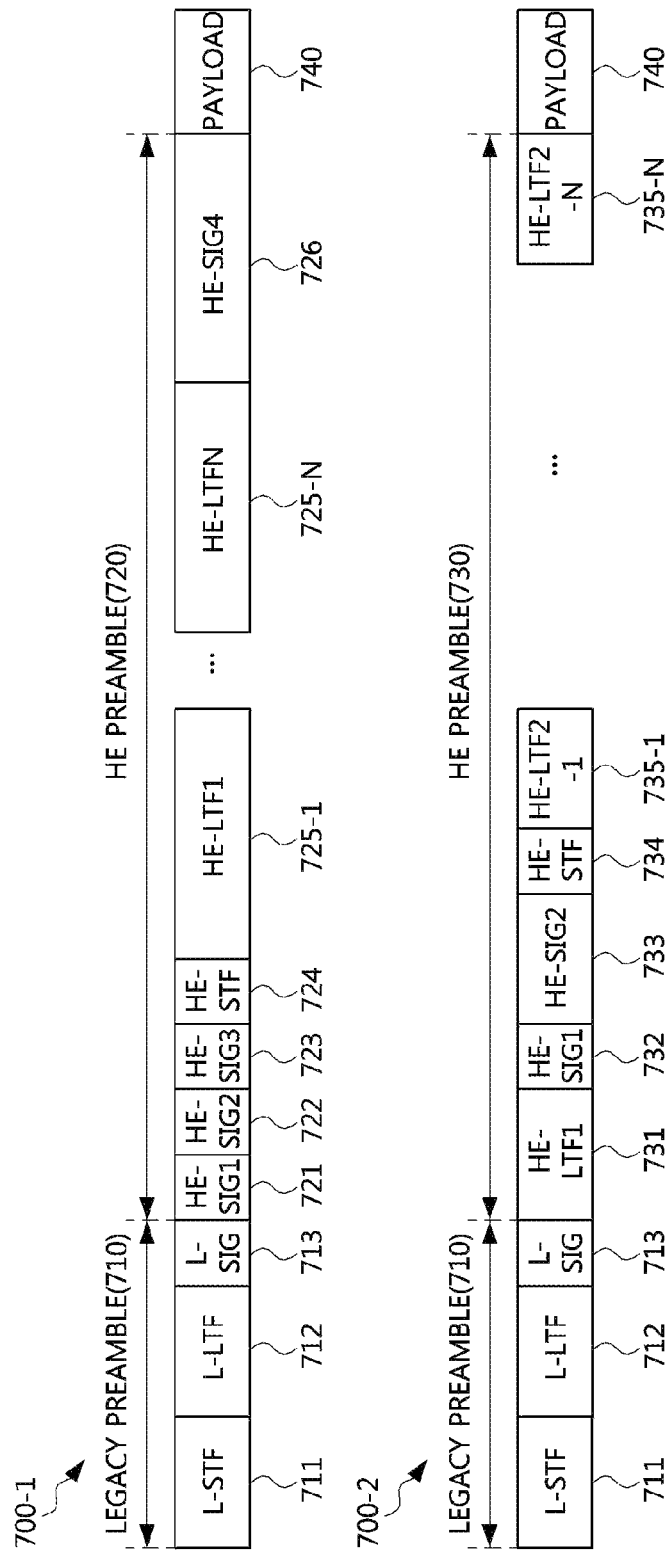
FIG. 7 is a block diagram illustrating embodiments of a HE PPDU.

FIG. 6 is a flow chart illustrating a method for transmitting a HE PPDU, and FIG. 7 is a block diagram illustrating embodiments of a HE PPDU.

Referring to FIG. 6 and FIG. 7, the station may generate a legacy preamble 710 (S600). Here, a HE PPDU 700-1 according to a first embodiment and a HE PPDU 700-2 according to a second embodiment may be transmitted through a frequency band including subcarriers having subcarrier spacing of 312.5 kHz, 156.25 kHz, or 78.125 kHz (e.g. a frequency band including 64, 128, or 256 subcarriers on 20 MHz basic bandwidth). The legacy preamble 710 included in the HE PPDU 700-1 may be identical to the legacy preamble 710 included in the HE PPDU 700-2. For example, the legacy preamble 710 may include a legacy short training field (L-STF) 711 having a length of 8 μsec, a legacy long training field (L-LTF) 712 having a length of 8 μsec, and a legacy signal (L-SIG) field 713 having a length of 4 μsec. When the HE PPDU 700-1 or the HE PPDU 700-2 is transmitted through a frequency band including subcarriers have subcarrier spacing of 156.25 kHz (e.g. a frequency band including 128 subcarriers on 20 MHz basic bandwidth), the legacy preamble 710 may be transmitted through even-numbered or odd-numbered 64 subcarriers among the 128 subcarriers. That is, the legacy preamble 710 may be transmitted through even-numbered or odd-numbered 64 subcarriers among outputs of the inverse Fourier transform 140 included in the station. When the HE PPDU 700-1 or the HE PPDU 700-2 is transmitted through a frequency band equal to or larger than 40 MHz bandwidth, the legacy preamble 710 may be transmitted as duplicated in unit of 20 MHz bandwidth.

The station may generate HE preamble 720 or 730 (S610). Although the HE preamble 720 or 730 is explained as generated after generating the legacy preamble 710 in embodiments, the legacy preamble 710 may be generated simultaneously with the HE preamble 720 or 730, or generated after generating the HE preamble 720 or 730. The HE preamble 720 of the HE PPDU 700-1 may include a HE-SIG1 field 721, a HE-SIG2 field 722, a HE-SIG3 field 723, a HE-STF 724, at least one HE-LTF 725-1, . . . , 725-N, and a HE-SIG4 field 726. Each of the HE-SIG1 field 721, HE-SIG2 field 722, and HE-SIG3 field 723 may be HE-SIG OFDM (orthogonal frequency division multiplexing) symbols following the legacy preamble 710. The HE-SIG1 field 721 and the HE-SIG2 field 722 may include a common control information needed for decoding the HE PPDU 700-1 in a receiving station. That is, the HE-SIG1 field 721 and the HE-SIG2 field 722 may be a HE-SIG-A field. The HE-SIG3 field 723 may include a user-specific control information. The HE-SIG3 field 723 may be a HE-SIG-B field. Here, a structure of the HE preamble 720 is not limited to that of FIG. 7 and related explanation, and it may have a variety of structures. For example, an order of the fields included in the HE preamble 720 of the HE PPDU 700-1 may be changed. Even when the order of them is changed, the scope of the present disclosure includes embodiments thereof. Also, some of the fields (e.g. some of multiple HE-LTFs 725, the HE-SIG4 726, etc.) included in the HE preamble 720 of the HE PPDU 700-1 illustrated in FIG. 7 may be omitted.

Each of HE-SIG1 field 721, HE-SIG2 field 722, and HE-SIG3 field 723 may include an OFDM symbol comprising a guard interval (GI) having a length of 0.8 μsec and a discrete Fourier transform (DFT) period having a length of 3.2 μsec (i.e., a whole OFDM symbol duration is 4 μsec). Although the length of GI included in HE-SIG1 field 721, HE-SIG2 field 722, and HE-SIG3 field 723 is explained as having a length of 0.8 μsec in an embodiment of the present disclosure, the length of GI may be configured to be 1.6 μsec or 3.2 μsec for a specific environment such as an outdoor environment. Each of the HE-SIG1 field 721, HE-SIG2 field 722, and HE-SIG3 field 723 may be transmitted through a frequency band including subcarriers having subcarrier spacing of 312.5 kHz (e.g. a frequency band including 64 subcarriers on 20 MHz basic bandwidth). When the legacy preamble 710 is transmitted through even-numbered (or, odd-numbered) subcarriers among subcarriers constituting the frequency band, the HE-SIG1 field 721, the HE-SIG2 field 722, and the HE-SIG3 field 723 may be transmitted through odd-numbered (or, even-numbered) 32 subcarriers. In other words, the HE-SIG1 field 721, the HE-SIG2 field 722, and the HE-SIG3 field 723 may be transmitted through odd-numbered (or, even-numbered) 32 subcarriers among outputs of the inverse Fourier transform 140 included in the station.

For auto-detection operation in the receiving station, the HE-SIG1 field 721 and the HE-SIG2 field 722 may be modulated in binary phase shift keying (BPSK) manner, and the HE-SIG3 field 723 may be modulated in quadrature BPSK (QBPSK) manner. That is, the fields modulated in "BPSK+BPSK+QBPSK" manner may indicate that a current PPDU is the HE PPDU 700-1. Alternatively, the HE-SIG1 field 721 and the HE-SIG3 field 723 may be modulated in QBPSK manner, and the HE-SIG2 field 722 may be modulated in BPSK manner. That is, the fields modulated in "QBPSK+BPSK+QBPSK" manner may indicate that a current PPDU is the HE PPDU 700-1. Meanwhile, the field modulated in BPSK manner may be transmitted as phase-shifted in a form of $\exp(-j*2*pi/128*[0:127])$ or $\exp(-j*2*pi/256*[0:255])$ in a time domain. The modulation schemes which can be used for identifying the HE-PPDU are not limited thereto, and the modulation schemes may be configured variously.

The HE-STF 724 may include an OFDM symbol comprising a GI having a length of 0.8 μsec and a DFT period having a length of 3.2 μsec (i.e., a whole OFDM symbol duration is 4 μsec). Or, for a specific environment such as the outdoor environment, the HE-STF 724 may include an OFDM symbol comprising a GI having a length of 1.6 μsec and a DFT period having a length of 6.4 μsec (i.e., a whole OFDM symbol duration is 8 μsec).

The HE-LTFs 725-1, . . . , 725-N may include an OFDM symbol comprising a GI having a length of 0.8 μsec, 1.6 μsec, or 3.2 μsec, and a DFT period having a length of 12.8 μsec. In this case, subcarrier spacing may become 78.125 kHz, and the HE-LTFs 725-1, . . . , 725-N may be transmitted through a frequency band including 256 subcarriers on 20 MHz basic bandwidth. In another embodiment, the HE-LTFs 725-1, . . . , 725-N may include an OFDM symbol comprising a GI having a length of 0.8 μsec, 1.6 μsec, or 3.2 μsec, and a DFT period having a length of 6.4 μsec. In this case, subcarrier spacing may become 156.25 kHz, and the HE-LTFs 725-1, . . . , 725-N may be transmitted through a frequency band including 128 subcarriers on 20 MHz basic bandwidth. The number of HE-LTFs 725-1, . . . , 725-N included in the HE preamble 720 may be configured based on the number of spatial streams onto which the RE PPDU 700-1 is mapped. For example, the number of HE-LTFs 725-1, . . . , 725-N may increase or decrease proportionally to the number of spatial streams. The HE-SIG4 field 726 may include an OFDM symbol comprising a GI having a length of 0.8 μsec, 1.6 μsec, or 3.2 μsec, and a DFT period having a length of 12.8 μsec. The payload 740 may include at least one data unit. The length of GI in the data unit included in the payload 740 may be 0.8 μsec, 1.6 μsec, or 3.2 μsec. The payload 740 may be transmitted through 64 FFT, 128 FFT, or 256 FFT on 20 MHz basic bandwidth.

The length of GI included in each of the HE-LTFs 725-1, . . . , 725-N and the HE-SIG4 field 726 may vary according to a transmission environment in which the HE PPDU 700-1 is transmitted. For example, when the HE PPDU 700-1 is transmitted in an indoor environment, the length of GI included in each of the HE-LTFs 725-1, . . . , 725-N and the HE-SIG4 field 726 may be configured to be relatively short values (e.g., 0.8 μsec or 1.6 μsec). Thus, in the indoor environment, the HE PPDU 700-1 may be transmitted through a frequency band (e.g., a frequency band including 64 or 128 subcarriers on 20 MHz basic bandwidth) including subcarriers having subcarrier spacing of 312.5 kHz or 156.25 kHz. Also, when the HE PPDU 700-1 is transmitted in the outdoor environment, the length of GI included in each of the HE-LTFs 725-1, . . . , 725-N and the HE-SIG4 field 726 may be configured to be relatively long values (e.g., 1.6 μsec or 3.2 μsec). Thus, in the outdoor environment, the HE PPDU 700-1 may be transmitted through a frequency band (e.g., a frequency band including 128 or 256 subcarriers on 20 MHz basic bandwidth) including subcarriers having subcarrier spacing of 156.25 kHz or 78.125 kHz. Therefore, each of the HE-STF 724, the HE-LTFs 725-1, . . . , 725-N, the HE-SIG4 field 726, and the payload 740 may be transmitted through a frequency band (e.g., a frequency band including 64, 128, or 256 subcarriers on 20 MHz basic bandwidth) including subcarriers having subcarrier spacing of 312.5 kHz, 156.25 kHz, or 78.125 kHz. On the other hand, the HE preamble 720 may further include other fields (e.g., HE-STF, HE-LTF, HE-SIG) other than the above-described fields, and be configured as a smaller unit than 20 MHz bandwidth (e.g. unit of 2.5 MHz, 5 MHz, or 10 MHz bandwidth).

The HE preamble 730 of the HE PPDU 700-2 may include a HE-LTF1 731, a HE-SIG1 field 732, a HE-SIG2 field 733, a HE-STF 734, and at least one HE-LTF2 735-1, . . . , 735-N. Here, a structure of the HE preamble 730 is not limited thereto, and it may have a variety of structures. For example, an order of the fields included in the HE preamble 730 of the HE PPDU 700-2 may be changed. Even when the order of the fields is changed, it should be included in the scope of the present disclosure. Also, some of the fields included in the HE preamble 730 of the HE PPDU 700-2 illustrated in FIG. 7 may be omitted.

The HE-LTF1 731 may include an OFDM symbol comprising a GI having a length of 1.611 μsec and a DFT period having a length of 6.4 μsec. The HE-SIG1 field 732 may include an OFDM symbol comprising a GI having a length of 0.8 μsec and a DFT period having a length of 3.2 μsec. The HE-LTF1 731 and the HE-SIG1 field 732 may be transmitted through a frequency band (e.g., a frequency band including 64 subcarriers on 20 MHz basic bandwidth) including subcarrier having subcarrier spacing of 312.5 kHz. The HE-SIG1 field 732 may include an OFDM symbol comprising a GI having a length of 0.8 μsec and a DFT period having a length of 3.2 μsec (i.e., a whole OFDM symbol duration is 4.0 μsec). When the legacy preamble 710 is transmitted through even-numbered (or, odd-numbered) subcarriers among subcarriers constituting the frequency band, each of the HE-LTF1 731 and the HE-SIG1 field 732 may be transmitted through odd-numbered (or, even-numbered) 32 subcarriers.

For auto-detection operation in the receiving station, the HE-LTF1 731 may be modulated in BPSK manner, and the HE-SIG1 field 732 may be modulated in QBPSK manner. That is, the fields modulated in "BPSK+BPSK+QBPSK" manner may indicate that a current PPDU is the HE PPDU 700-2. Meanwhile, the field modulated in BPSK manner may be transmitted as phase-shifted in a form of $\exp(j*2*pi/128*[0:127])$ or $\exp(-j*2*pi/256*[0:255])$ in the time domain. The modulation schemes which can be used for identifying the HE-PPDU 700-2 are not limited thereto, and the modulation schemes may be configured variously.

The HE-SIG2 field 733 may include an OFDM symbol comprising a GI having a length of 0.8 μsec, 1.6 μsec, or 3.2 μsec, and a DFT period having a length of 6.4 μsec. The HE-STF field 734 may include an OFDM symbol comprising a GI having a length of 0.8 μsec and a DFT period having a length of 3.2 μsec (i.e., a whole OFDM symbol duration is 4.0 μsec). Alternatively, the HE-STF field 734 may include an OFDM symbol comprising a GI having a length of 1.6 μsec and a DFT period having a length of 6.4 μsec (i.e., a whole OFDM symbol duration is 8.0 μsec) in a specific environment such as the indoor environment.

The HE-LTF2s 735-1, . . . , 735-N may include an OFDM symbol comprising a GI having a length of 0.8 μsec, 1.6 μsec, or 3.2 μsec, and a DFT period having a length of 6.4 μsec. The number of HE-LTF2s 735-1, . . . , 735-N included in the HE preamble 730 may be configured based on the number of spatial streams onto which the HE PPDU 700-2 is mapped. For example, the number of HE-LTF2s 735-1, . . . , 735-N may increase or decrease proportionally to the number of spatial streams. The payload 740 may include at least one data unit. The length of GI in the data unit included in the payload 740 may be 0.8 μsec, 1.6 μsec, or 3.2 μsec. The payload 740 may be transmitted through 64 FFT, 128 FFT, or 256 FFT on 20 MHz basic bandwidth.

The length of GI included in each of the HE-SIG2 field 733 and the HE-LTF2s 735-1, . . . , 735-N may vary according to a transmission environment in which the HE PPDU 700-2 is transmitted. For example, when the HE PPDU 700-2 is transmitted in the indoor environment, the length of GI included in each of the HE-SIG2 field 733 and the HE-LTF2s 735-1, . . . , 735-N may be configured to be relatively short values (e.g., 0.8 μsec or 1.6 μsec). Thus, in the indoor environment, the HE PPDU 700-2 may be transmitted through a frequency band (e.g., a frequency band including 64 or 128 subcarriers on 20 MHz basic bandwidth) including subcarriers having subcarrier spacing of 312.5 kHz or 156.25 kHz. Also, when the HE PPDU 700-2 is transmitted in the outdoor environment, the length of GI included in each of the HE-SIG2 field 733 and the HE-LTF2s 735-1, . . . , 735-N may be configured to be relatively long values (e.g., 1.6 μsec or 3.2 μsec). Thus, in the outdoor environment, the HE PPDU 700-2 may be transmitted through a frequency band (e.g., a frequency band including 128 or 256 subcarriers on 20 MHz basic bandwidth) including subcarriers having subcarrier spacing of 156.25 kHz or 78.125 kHz.

Each of the HE-SIG2 field 733, the HE-STF 734, the HE-LTF2s 735-1, . . . , 735-N, and the payload 740 may be transmitted through a frequency band (e.g., a frequency band including 64, 128, or 256 subcarriers on 20 MHz basic bandwidth) including subcarriers having subcarrier spacing of 312.5 kHz, 156.25 kHz, or 78.125 kHz. In other words, on 20 MHz basic bandwidth, each of the HE-SIG2 field 733, the HE-STF 734, the HE-LTF2s 735-1, . . . , 735-N, and the payload 740 may be transmitted through 64, 128, or 256 subcarriers. On the other hand, the HE preamble 730 may further include other fields (e.g., HE-STF, HE-LTF, HE-SIG) other than the above-described fields, and be configured as a smaller unit than 20 MHz bandwidth (e.g. unit of 2.5 MHz, 5 MHz, or 10 MHz bandwidth).

The station may generate the HE PPDU 700-1 or 700-2 comprising the legacy preamble 710, the HE preamble 720 or 730, and the payload 740 (S620), and transmit the generated HE PPDU 700-1 or 700-2 (S630). The station may transmit the legacy preamble 710 through a frequency band (e.g., a frequency band including 64 subcarriers on 20 MHz basic bandwidth) including subcarriers having subcarrier spacing of 312.5 kHz, transmit the HE-SIG1 field 721, the HE-SIG2 field 722, and the HE-SIG3 field 723 included in the HE preamble 720 (or, the HE-LTF1 731 and the HE-SIG1 field 732 included in the HE preamble 730) through a frequency band including subcarriers having subcarrier spacing of 312.5 kHz (e.g. a frequency band including 64 subcarriers on 20 MHz basic bandwidth), and transmit the HE-STF 724, the HE-LTFs 725-1, . . . , 725-N, and the HE-SIG4 field 726 included in the HE preamble 720 (or, the HE-SIG2 field 733, the HE-STF 734, and the HE-LTF2s 735-1, . . . , 735-N included in the HE preamble 730) through a frequency band including subcarriers having subcarrier spacing of 312.5 kHz, 156.25 kHz, or 78.125 kHz (e.g., a frequency band including 64, 128, or 256 subcarriers on 20 MHz basic bandwidth).

Meanwhile, the receiving station may receive the legacy preamble 710 through a frequency band (e.g., a frequency band including 64 subcarriers on 20 MHz basic bandwidth) including subcarriers having subcarrier spacing of 312.5 kHz, and receive the HE-SIG1 field 721, the HE-SIG2 field 722, and the HE-SIG3 field 723 included in the HE preamble 720 (or, the HE-LTF1 731 and the HE-SIG1 field 732 included in the HE preamble 730) through a frequency band including subcarriers having subcarrier spacing of 312.5 kHz (e.g. a frequency band including 64 subcarriers on 20 MHz basic bandwidth). The receiving station may determine whether the currently received PPDU is the HE PPDU 700-1 or 700-2 by performing auto-detection operation on the HE-SIG1 field 721, the HE-SIG2 field 722, and the HE-SIG3 field 723 included in the HE preamble 720 (or, the HE-LTF1 731 and the HE-SIG1 field 732 included in the HE preamble 730), and demodulate the fields in "BPSK+BPSK+QBPSK" manner or "QBPSK+BPSK+QBPSK" manner. Also, the receiving station may receive the HE-STF 724, the HE-LTFs 725-1, . . . , 725-N, and the HE-SIG4 field 726 included in the HE preamble 720 (or, the HE-SIG2 field 733, the HE-STF 734, and the HE-LTF2s 735-1, . . . , 735-N included in the HE preamble 730) through a frequency band including subcarriers having subcarrier spacing of 312.5 kHz, 156.25 kHz, or 78.125 kHz (e.g., a frequency band including 64, 128, or 256 subcarriers on 20 MHz basic bandwidth).

The receiving station may determine whether the currently received PPDU is a HE PPDU used for the indoor environment or for the outdoor environment based on signal-to-noise ratio (SNR) or signal-to-interference plus noise-ratio (SINR) of the preambles 710, 720, and 730 included in the HE PDDU 700-1 and 700-2. For example, the receiving station may determine the currently received PPDU as a HE PPDU used for the outdoor environment when time-domain signal strength (SNR or SNIR) of the HE preambles 720 and 730 (e.g., the HE-SIG fields 721, 722, 723, 732, and 733 located before the HE-LTF 725 and 735) is larger than frequency-domain signal strength (SNR or SINR) of them. That is, when communications are performed in the outdoor environment, delay spreading effect increases. In the time domain, the effect of delay spreading can be canceled out by GI so that enough time-domain signal strength can be obtained. On the contrary, in the frequency domain, the effect of delay spreading can make effect as interferences between subcarriers so that the frequency-domain signal strength can be decreased. Also, when the time-domain signal strength (SNR or SINR) is similar to the frequency-domain signal strength (SNR or SINR), that is, when a difference between the time-domain signal strength and the frequency-domain signal strength exists in a predetermined range (e.g., 5 dB), the receiving station may determine that the currently received PPDU is a HE PPDU used for the indoor environment.

Meanwhile, the station (i.e., access point) may generate a beacon frame including the above-described HE preamble 720 or 730. Hereinafter, the beacon frame including the HE preamble 720 or 730 is referred to as 'HE beacon frame', and a beacon frame supporting standards (e.g., IEEE 802.11a/b/g/n/ac) prior to IEEE 802.11ax is referred to as 'legacy beacon frame'. The HE beacon frame may be identical to the legacy beacon frame excluding the fact that the HE beacon frame includes the HE preamble 720 or 730.

Figure 8:
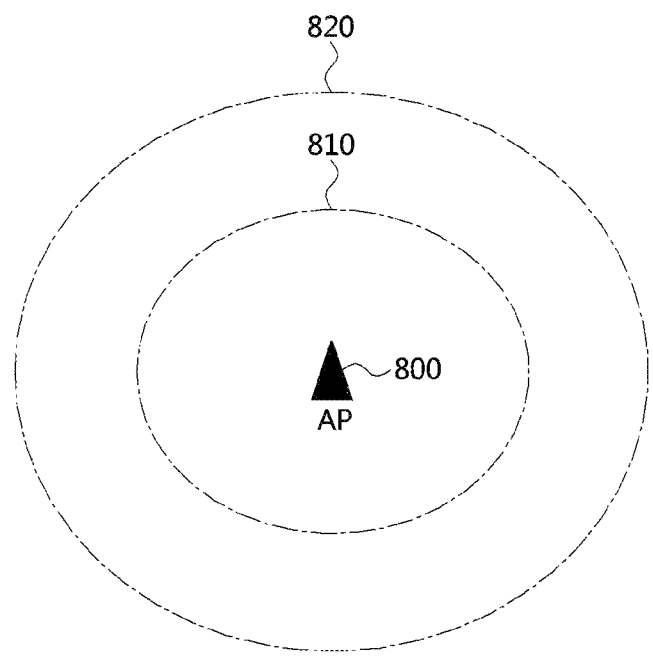
FIG. 8 is a conceptual diagram illustrating a transmission range of a beacon frame.

FIG. 8 is a conceptual diagram illustrating a transmission range of a beacon frame.

Referring to FIG. 8, an access point 800 may transmit the legacy beacon frames and the HE beacon frames by using the same transmission power. A first region 810 may mean a region in which a station can successfully decode the legacy beacon frames, and a second region 820 may mean a region in which the station can successfully decode the HE beacon frames. That is, since GI of fields included in the HE beacon frames is configured as longer than GI of fields included in the legacy beacon frames, the HE beacon frames are more robust to interferences and errors as compared to the legacy beacon frames. Thus, the station located far from the access point 800 can successfully decode the HE beacon frames even when the station cannot decode the legacy beacon frames.

Figure 9:
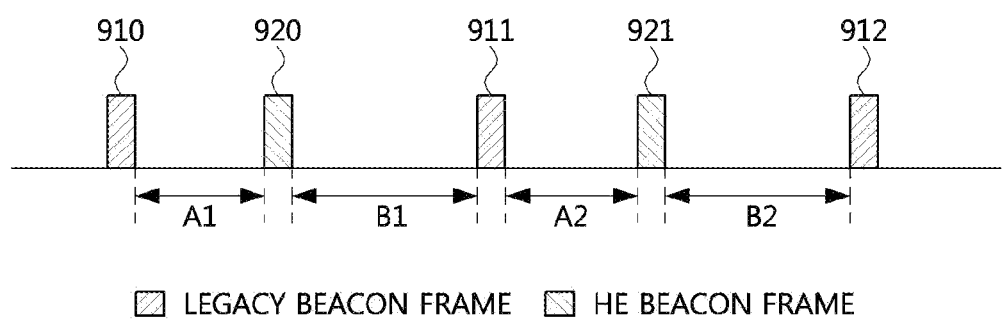
FIG. 9 is a timing diagram illustrating a method for transmitting a beacon frame.

FIG. 9 is a timing diagram illustrating a method for transmitting a beacon frame.

Referring to FIG. 9, the access point 800 may transmit legacy beacon frames 910, 911, and 912, and transmit HE beacon frames 920 and 921 with a predetermined periodicity. The legacy beacon frames 910 and 911 may configure communication durations A1 and A2, or configure communication durations A1, B1, A2, and B2. For example, the communication durations A1 and A2 (or, communication durations A1, B1, A2, and B2) may be indicated by resource allocation information (e.g., restricted access window (RAW) parameters specified in IEEE 802.11 ah standard) included in the legacy beacon frames 910 and 911. Also, the communication durations B1 and B2 may be indicated by the HE beacon frames 920 and 921. For example, the communication durations B1 and B2 may be indicated by resource allocation information (e.g., RAW parameters specified in IEEE 802.11ah standard) included in the HE beacon frames 920 and 921. Each of the communication durations A1 and A2 may mean a time duration from an end point of the legacy beacon frame 910 or 911 to a start point of the HE beacon frames 920 or 921. Each of the communication durations B1 and B2 may mean a time duration from an end point of the HE beacon frame 920 or 921 to a start point of the legacy beacon frame 911 or 912.

In the first embodiment, if the station decodes the legacy beacon frames 910 or 911, the station may perform communications in the communication durations A1 or A2 configured by the legacy beacon frame 910 or 911. Also, if the station decodes the HE beacon frames 920 or 921, the station may perform communications in the communication durations B1 or B2 configured by the HE beacon frame 920 or 911. On the contrary, if the station cannot decode the HE beacon frames 920 or 921 (e.g., the station does not support IEEE 802.11ax standard), the station cannot perform communications in the communication durations B1 or B2.

In the second embodiment, if the station decodes the legacy beacon frames 910 or 911, the station may perform communications in the communication durations A1, B1, A2, or B2 configured by the legacy beacon frame 910 or 911. Also, if the station decodes the HE beacon frame 920 or 921, the station may perform communications with a higher priority than a station which cannot decode the HE beacon frame 920 or 921. For example, the station which decodes the HE beacon frame 920 or 921 can perform communication by using a shorter contention window (CW).

According to the present disclosure, the HE PPDU used in the station supporting IEEE 802.11ax standard can be generated, and the generated HE PPDU can be transmitted. Therefore, performance of a WLAN system can be enhanced.

While the example embodiments of the present disclosure and their advantages have been described in detail, it should be understood that various changes, substitutions and alterations may be made herein without departing from the scope of the disclosure.

What is claimed is:

1. A transmission method performed in a station, the transmission method comprising:
generating a legacy preamble;
generating a high efficiency (HE) preamble including at least one HE-signal (HE-SIG) field, a HE-short training field (HE-STF), and at least one HE-long training field (HE-LTF);
generating a HE physical layer convergence procedure protocol data unit (HE PPDU) including the legacy preamble and the HE preamble; and
transmitting, over a wireless medium, the HE PPDU,
wherein the legacy preamble, the at least one HE-SIG field, and the HE-STF each have a subcarrier spacing of 312.5 kHz, and
wherein the at least one HE-LTF has a subcarrier spacing of 156.25 kHz and a Discrete Fourier Transform (DFT) period having a length of 6.4 µsec when the HE PPDU is transmitted in a first communication environment, and has a subcarrier spacing of 78.125 kHz and a DFT period having a length of 12.8 µsec when the HE PPDU is transmitted in a second communication environment.

2. The transmission method of claim 1, wherein the at least one HE-SIG field includes a HE-signal1 (HE-SIG1) field, a HE-signal2 (HE-SIG2) field, and a HE-signal3 (HE-SIG3) field.

3. The transmission method of claim 2, wherein the HE-SIG1 field and the HE-SIG2 field are modulated in binary phase shift keying (BPSK) manner, and the HE-SIG3 field is modulated in quadrature BPSK (QBPSK) manner.

4. The transmission method of claim 1, wherein the HE-SIG field includes a discrete Fourier transform (DFT) period having a length of 3.2 µsec.

5. The transmission method of claim 1, wherein the HE-SIG field is duplicated in unit of 20 MHz bandwidth.

6. The transmission method of claim 1, wherein a number of the at least one HE-LTF included in the HE preamble is configured based on a number of spatial streams onto which the HE PPDU is mapped.

7. The transmission method of claim 1, wherein the HE-STF includes a DFT period having a length of 3.2 µsec.

8. The transmission method of claim 1, wherein the HE-LTF includes a guard interval (GI) having a length of 0.8 µsec, 1.6 µsec, or 3.2 µsec.

9. The transmission method of claim 1, wherein the HE-SIG field is an HE Signal A (HE-SIG-A) field or an HE Signal B (HE-SIG-B) field.

10. The transmission method of claim 1, wherein the first communication environment is an indoor environment and the second communication environment is an outdoor environment.

11. A reception method performed in a station, the reception method comprising:
receiving, over a wireless medium, a high efficiency physical layer convergence procedure protocol data unit (HE PPDU), the HE PPDU including a legacy preamble and an HE preamble including at least one high efficiency signal (HE-SIG) field, a HE-short training field (HE-STF), and at least one HE Long Training Field (HE-LTF); and
performing channel estimation using the HE-LTF,
wherein the legacy preamble, the at least one HE-SIG field, and the HE-STF each have a subcarrier spacing of 312.5 kHz, and
wherein the at least one HE-LTF has a subcarrier spacing of 156.25 kHz and a DFT period having a length of 6.4 µsec when the HE PPDU is received in a first communication environment, and has a subcarrier spacing of 78.125 kHz and a DFT period having a length of 12.8 µsec when the HE PPDU is received in a second communication environment.

12. The reception method of claim 11, wherein the at least one HE-SIG field includes a HE-signal1 (HE-SIG1) field, a HE-signal2 (HE-SIG2) field, and a HE-signal3 (HE-SIG3) field.

13. The reception method of claim 12, wherein the HE-SIG1 field and the HE-SIG2 field are modulated in binary phase shift keying (BPSK) manner, and the HE-SIG3 field is modulated in quadrature BPSK (QBPSK) manner.

14. The reception method of claim 11, wherein the HE-SIG field includes a discrete Fourier transform (DFT) period having a length of 3.2 μsec.

15. The reception method of claim 11, wherein the HE-SIG field is duplicated in unit of 20 MHz bandwidth.

16. The reception method of claim 11, wherein the HE-STF includes a DFT period having a length of 3.2 μsec.

17. The reception method of claim 11, wherein the HE-LTF includes a guard interval (GI) having a length of 0.8 μsec, 1.6 μsec, or 3.2 μsec.

18. The reception method of claim 11, wherein the HE-SIG field is an HE Signal A (HE-SIG-A) field or an HE Signal B (HE-SIG-B) field.

19. The reception method of claim 11, wherein the first communication environment is an indoor environment and the second communication environment is an outdoor environment.

* * * * *